United States Patent
Weaver et al.

(10) Patent No.: US 9,574,131 B2
(45) Date of Patent: Feb. 21, 2017

(54) MUCILAGE COMPRISING TREATMENT FLUIDS FOR SUBTERRANEAN FORMATION OPERATIONS

(71) Applicant: Halliburton Energy Services, Inc., Houston, TX (US)

(72) Inventors: Jimmie Weaver, Duncan, OK (US); Ali Alwattari, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/783,439

(22) PCT Filed: Aug. 29, 2013

(86) PCT No.: PCT/US2013/057284
§ 371 (c)(1),
(2) Date: Oct. 9, 2015

(87) PCT Pub. No.: WO2015/030772
PCT Pub. Date: Mar. 5, 2015

(65) Prior Publication Data
US 2016/0053165 A1   Feb. 25, 2016

(51) Int. Cl.
*C09K 8/82* (2006.01)
*C09K 8/035* (2006.01)
*C09K 8/60* (2006.01)
*F17D 1/17* (2006.01)

(52) U.S. Cl.
CPC ............ *C09K 8/82* (2013.01); *C09K 8/035* (2013.01); *C09K 8/60* (2013.01); *F17D 1/17* (2013.01); *C09K 2208/08* (2013.01); *C09K 2208/28* (2013.01)

(58) Field of Classification Search
CPC .. C09K 8/82; C09K 2208/08; C09K 2208/28; C09K 8/035; C09K 8/60
USPC ................................... 507/200, 201
See application file for complete search history.

(56) References Cited

U.S. PATENT DOCUMENTS

2012/0157354 A1* 6/2012 Li .................... C09K 8/08
507/129
2013/0312961 A1* 11/2013 Reyes .............. C09K 8/5758
166/279

FOREIGN PATENT DOCUMENTS

WO    2015030772 A1    3/2015

OTHER PUBLICATIONS

McKinley, "Dimensionless Groups for Understanding Free Surface Flows of Complex Fluids," Hatsopoulos Microfluids Laboratory, HML Report No. 05-P-05, SOR Rehology Bulletin, Jul. 2005.

(Continued)

*Primary Examiner* — Frances Tischler
(74) *Attorney, Agent, or Firm* — McDermott Will & Emery LLP; Craig Roddy

(57) ABSTRACT

Some embodiments disclosed herein comprise a method of treating a subterranean formation comprising: providing a treatment fluid comprising a base fluid and an extracted natural mucilage; and introducing the treatment fluid into the subterranean formation. The treatment fluid may further comprise a mucin in an amount in the range of from about 0.000001% to about 10% by weight in the treatment fluid.

20 Claims, 1 Drawing Sheet

(56) References Cited

OTHER PUBLICATIONS

Sangwan et al., "Mucilages and Their Pharaceutical Applications: an Oveview" Pharmacologyonline2 1265-1271, 2011.
Acharya, "Particle Transport in Viscous and Viscoelastic Fracturing Fluids," SPE 13179, 1986.
International Search Report and Written Opinion for PCT/US2013/057284 dated May 26, 2014.

* cited by examiner

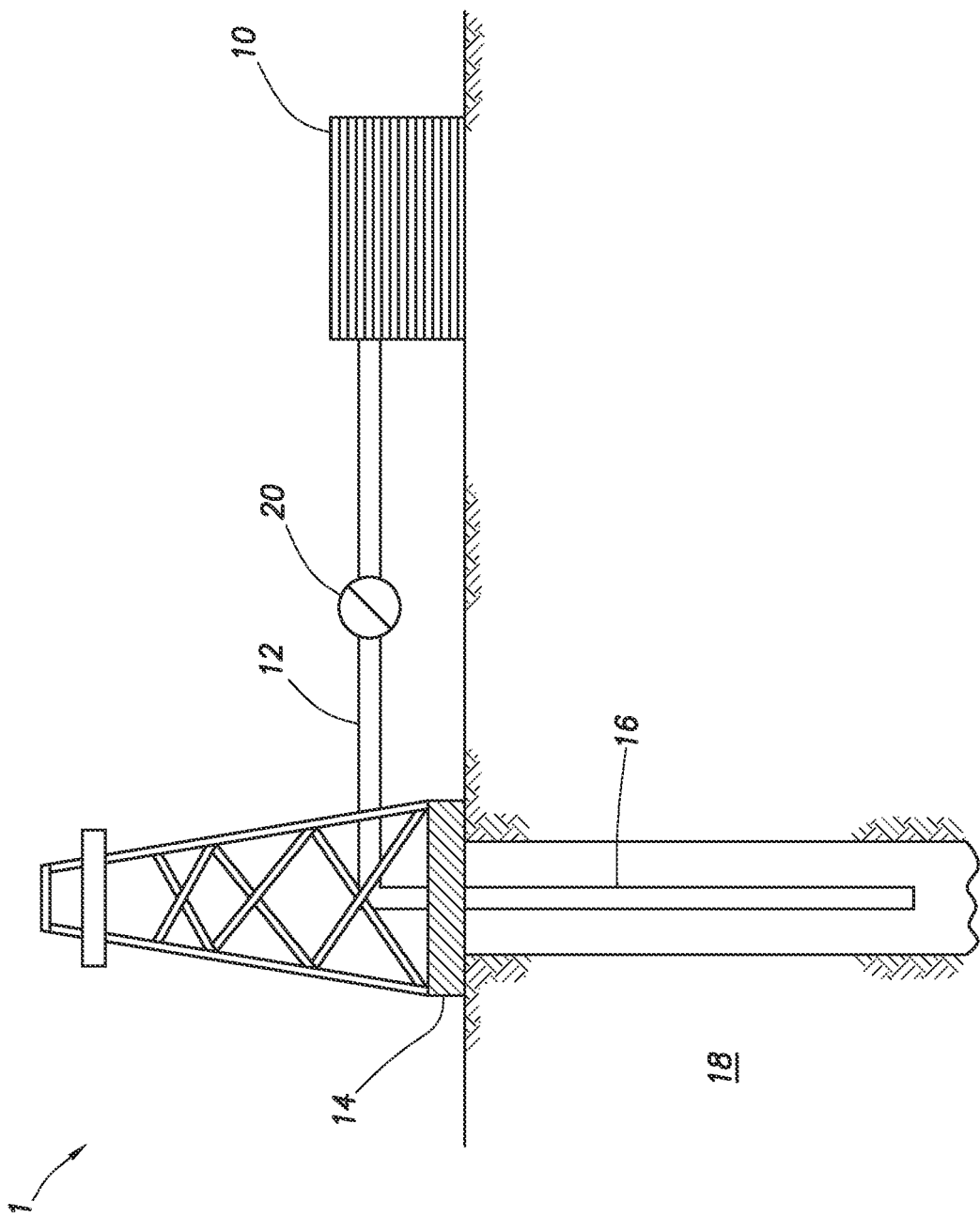

MUCILAGE COMPRISING TREATMENT FLUIDS FOR SUBTERRANEAN FORMATION OPERATIONS

BACKGROUND

The methods of the embodiments described herein relate to treatment fluids for use in subterranean formation operations comprising mucilage compositions.

Subterranean wells (e.g., hydrocarbon producing wells, water producing wells, and the like) are often stimulated by hydraulic fracturing treatments. in hydraulic fracturing treatments, a treatment fluid is pumped into a portion of a subterranean formation at a rate and pressure such that the subterranean formation breaks down and one or more fractures are formed. Typically, particulate solids, such as graded sand, are suspended in a portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppant particulates aid in forming conductive paths through which produced fluids, such as hydrocarbons, may flow. Therefore, the ability of the treatment fluid to adequately suspend the proppant particulates with minimal or no settling is important to the success of the stimulation operation.

Well stimulation typically requires large amounts of treatment fluids to be pumped downhole under high pressures and flow rates over short periods of time, causing turbulent flow of the treatment fluid. The turbulence results in friction pressure between the treatment fluid and the stimulation equipment (e.g., wellbore piping, wellbore casing, etc.) and between the treatment fluid and the subterranean formation. The friction pressure increases the energy necessary to pump the treatment fluid downhole and can cause damage to stimulation equipment and the formation at extreme financial costs.

To combat the friction pressure, friction reducers are often added to treatment fluids. Traditional friction reducers are typically polymers (e.g., polyacrylamide, guar gum) that are able to change the rheological properties of the treatment fluid to overcome or minimize friction pressure. Some traditional friction reducing polymers may be characterized by a large hydrodynamic radius such that upon shearing, the friction reducing polymers can absorb energy from high nucleation sites by stretching to a more relaxed form and redistribute the energy to other locales. Other traditional friction reducing polymers may swell to form sticky dispersions or gelatinize so as to suspend turbulent flow.

While traditional friction reducing polymers are effective at reducing friction pressure, enhanced friction reduction is sometimes necessary for particular subterranean formation operations. Moreover, simultaneous enhanced friction reduction and viscosification of the treatment fluid for particulate suspension (e.g., proppant particulates) may be preferred.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the mucilage comprising treatment fluids described herein to a downhole location.

DETAILED DESCRIPTION

The methods of the embodiments described herein relate to treatment fluids for use in subterranean formation operations comprising compositions.

Although some embodiments described herein are illustrated by reference to hydraulic stimulation treatments, the treatment fluids disclosed herein may be used in any subterranean formation operation that may benefit from a fluid with friction reducing and/or viscosification properties. Such treatment operations may include, but are not limited to, a drilling operation; a lost circulation operation; a stimulation operation; an acidizing operation; an acid-fracturing operation; a sand control operation; a completion operation; an acidizing operation; a scale inhibiting operation; a water-blocking operation; a clay stabilizer operation; a fracturing operation; a frac-packing operation; a gravel packing operation; a wellbore strengthening operation; a sag control operation; and any combination thereof.

Moreover, the treatment fluids and/or mucilages described herein may be used in any non-subterranean operation that may benefit from their friction reducing and/or viscosifying properties. Such operations may be performed in any industry including, but not limited to, oil and gas, mining, chemical, pulp and paper, converting, aerospace, medical, automotive, and the like.

One or more illustrative embodiments disclosed herein are presented below. Not all features of a physical implementation are described or shown in this application for the sake of clarity. It is understood that in the development of a physical embodiment incorporating the embodiments disclosed herein, numerous implementation-specific decisions must be made to achieve the developer's goals, such as compliance with system-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

In some embodiments described herein, a method of treating a subterranean formation is disclosed comprising introducing a treatment fluid into the subterranean formation comprising a base fluid and an extracted natural mucilage. In other embodiments, the treatment fluid comprises a base fluid and a mucilage copolymer comprising an extracted natural mucilage and a polymeric agent. In still other embodiments, the treatment fluid comprises a base fluid and a synthetic mucilage-type agent comprising a polymeric agent and a fibrous protein agent. As used herein, the terms "natural mucilage," "mucilage copolymer," and "synthetic mucilage-type agent" may be collectively referred to "mucilages" or "mucilage compositions."

The success of hydraulic stimulation operation is often determined based on two performance factors. First, the ability of a treatment fluid to contact the subterranean formation surface and, second, the return oil flow capacity therefrom. Mucilages are capable of enhancing these performance factors because they impart lubricity and hydraulic force transmission to the treatment fluid into which they are included. As defined herein, the term "mucilage," refers to a substance (natural, synthetic, or a combination thereof) capable of forming a slippery colloidal dispersion in aqueous fluids. In aqueous fluids, mucilages may impart viscosity (e.g., a gelation effect) capable of transmitting hydraulic force and lubricity due to pituitance and self-alignment in flow (i.e., when they experience friction). As used herein, the term "pituitance" and all of its variations (e.g., "pituity") refers to an elongated, fibrous shape (e.g., stringy, sinewy, and the like). As used herein, the term "alignment" in all of its variations (e.g., "aligned") refers to the orientation of the mucilages in the same directional plane. Thus, the properties of the mucilage compositions disclosed herein allow the mucilage alone to provide sufficient viscosity to suspend particulates in the treatment fluid, such as proppant particulates, while reducing the friction pressure between the treatment fluid and stimulation equipment and the subterranean formation. Although they may be used alone, they may be coupled with traditional friction reducers and/or other additives to enhance their properties.

The mucilages disclosed in the embodiments herein include extracted natural mucilages, mucilage copolymers, and synthetic mucilage-type agents. Natural mucilages are high molecular weight polyuronides consisting of sugar and uronic acid units. Natural mucilages are chemically inert, nontoxic, and economically affordable due to their abundance and ease of extraction. They can be extracted from a large variety of plants and microorganisms by any means known in the art. Suitable extraction methods may include, but are not limited to, co-precipitation and purification; boiling in water; enzymatic extraction, and the like. In exemplary embodiments, the extraction method for producing the extracted natural mucilages described herein is boiling in water, Suitable extracted natural mucilages for use in the embodiments disclosed herein include, but are not limited to, a mucilage-containing organism selected from the group consisting of taxonomic family Cactaceae; taxonomic family Alariaceae; taxonomic family Chordaceae; taxonomic family Laminariaceae; taxonomic family Lessoniaceae; taxonomic family Phyllariaceae; taxonomic family Pseudochordaceae; taxonomic family Malvaceae; taxonomic genus *Aloe*; taxonomic genus *Basella*; taxonomic genus *Chondrus*; taxonomic genus *Dioscorea*; taxonomic genus *Drosera*; taxonomic genus *Drosophyllum*; taxonomic genus *Trigo-nella*; taxonomic genus *Linum*; taxonomic genus *Splachnidium*; taxonomic genus *Glycyrrhiza*; taxonomic genus *Althaea*; taxonomic genus *Verbascum*; taxonomic genus *Abelmoschus*; taxonomic genus *Parthenium*; taxonomic genus *Pinguicula*; taxonomic genus *Plantago*; taxonomic genus *Salvia*; and any combination thereof.

In some embodiments, the mucilage selected for use in the treatment fluids of the embodiments described herein is a mucilage copolymer. The mucilage copolymer may be a copolymer of an extracted natural mucilage and a polymeric agent. The mucilage copolymer may be selected so as to possess the properties of both a mucilage and a polymeric friction reducing agent. The two elements may synergistically operate as a copolymer to enhance friction reduction and viscosification beyond which either one alone could provide. Suitable extracted natural mucilages may include, but are not limited to, any of those extracted natural mucilages that may be used alone in the treatment fluids disclosed herein including, but not limited to, a mucilage-containing organism selected from the group consisting of taxonomic family Cactaceae; taxonomic family Alariaceae; taxonomic family Chordaceae; taxonomic family Laminariaceae; taxonomic family Lessoniaceae; taxonomic family Phyllariaceae; taxonomic family Pseudochordaceae; taxonomic family Malvaceae; taxonomic genus *Aloe*; taxonomic genus *Basella*; taxonomic genus *Chondrus*; taxonomic genus *Dioscorea*; taxonomic genus *Drosera*; taxonomic genus *Drosophyllum*; taxonomic genus *Trigonella*; taxonomic genus *Linum*; taxonomic genus *Splachnidium*; taxonomic genus *Glycyrrhiza*; taxonomic genus *Althaea*; taxonomic genus *Verbascum*; taxonomic genus *Abelmoschus*; taxonomic genus *Parthenium*; taxonomic genus *Pinguicula*; taxonomic genus *Plantago*; taxonomic genus *Salvia*; and any combination thereof.

The polymeric agent for use in the mucilage copolymers in some embodiments herein may include, but are not limited to, a monomer; a polymer; a copolymer; a terpolymer; and combination thereof. Specific polymeric agents for use in forming the mucilage copolymers disclosed herein include, but are not limited to, an acrylamide; an acrylic acid; a polyacrylamide; a hydroxypropylcellulose; a hydroxypropylmethylcellulose; a hydroxyethyl cellulose; a carboxyethylcellulose; a carboxymethylhydroxyethylcellulose; a scleroglucal; a succinoglycan; a diutan; a polyvinylpyrrolidone; a xanthan gum; a carboxymethylcellulose; a guar gum; a hydroxyethyl guar; a hydroxypropyl guar; a carboxymethyl guar; a carboxymethylhydroxyethyl guar; a carboxymethylhydroxypropyl guar; a polyethylene oxide; a polyvinylalcohol; a polyvinylpyrrolidone-vinyl acetate copolymer; a polyvinylmethyether-maleic acid copolymer; a protein-amino acid copolymer (e.g., alanine-glycine copolymer); an acrylate; a quarternized aminoalkyl acrylate; dimethyl aminoethyl acrylate; a sulfonate; a glycolate; a lactate; 2-acrylamido-2-methylpropanesulfonic acid; N,N-dimethyl acrylamide; vinylsulfonic acid; N-vinyl acetamide; N-vinyl formamide; any polymers thereof; any copolymers thereof; any terpolymers thereof; any derivatives thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. Selection of a particular ratio of mucilage to polymeric agent for use in forming the mucilage copolymers described in some embodiments herein is highly dependent upon the type of mucilage and polymeric agent selected, the lubricity and pituitance desired for a specific subterranean formation operation, and the like, and is within the ability of one of ordinary in the art, with the benefit of this disclosure.

In some embodiments, the polymeric agent for use in the mucilage copolymer may be water-soluble. In other embodiments, the polymeric agent for use in the mucilage copolymer may be water-dispersible, such that it may be dispersed by heat, pH, or a solvent. For example, use of a polymeric agent that is a polyvinylpyrrolidone-polyacrylamide copolymer, a protein-amino acid copolymer (e.g., analine-glycine copolymer), or others that are particularly hydrophobic may be characterized as water-dispersible. In such cases, where a water-dispersible polymeric agent is selected and dispersion of the polymeric agent cannot be achieved by conditions in the subterranean formation (e.g., reaching a certain pH and/or temperature), the treatment fluid comprising the mucilage copolymer may further comprise a solvent. Any solvent that is compatible with the mucilage copolymer and that achieves the desired dispersion effect of the polymeric agent is suitable for use in the embodiments disclosed herein.

Suitable solvents may include, but are not limited to, butyl lactate; dipropylene glycol methyl ether; dipropylene glycol dimethyl ether; dimethyl formamide; diethyleneglycol methyl ether; ethyleneglycol butyl ether; diethyleneglycol butyl ether; propylene carbonate; methanol; isopropanol; butyl alcohol; d'limonene; a fatty acid methyl ester; butylglycidyl ether; glycol ether; any derivative thereof; and any combination thereof. Suitable glycol ether solvents may include, but are not limited to, diethylene glycol methyl ether; dipropylene glycol methyl ether; 2-butoxy ethanol; an ether of a C2 to C6 dihydric alkanol containing at least one C1 to C6 alkyl group; a mono ether of a dihydric alkanol; methoxypropanol; butoxyethanol; hexoxyethanol; any isomer thereof; and any combination thereof. Selection of an appropriate solvent is dependent on the polymeric agent chosen, as well as the mucilage, for use in the mucilage copolymer and is within the ability of one skilled in the art, with the benefit of this disclosure.

In some exemplary embodiments, the extracted natural mucilage in the mucilage copolymer is from the mucilage-containing organism from the taxonomic genus *Plantago* and the polymeric agent in the mucilage copolymer is acrylamide. In some exemplary embodiments, the mucilage copolymer is a graft copolymer. As defined herein, the term "graft copolymer" refers to a copolymer having side chains that are structurally distinct from the backbone of the copolymer.

The mucilage in the treatment fluids disclosed in some embodiments herein may be a synthetic mucilage-type agent. The synthetic mucilage-type agent possesses the same properties as the natural mucilages and the mucilage copolymers described herein. That is, the synthetic mucilage-type agent forms a slippery colloidal dispersion in aqueous fluids and may impart viscosity capable of hydraulic force transmission and lubricity due to pituitance and self-alignment in flow. The synthetic mucilage-type agents disclosed herein may be formed from a polymeric agent and a fibrous protein. Suitable polymeric agents include any monomer; polymer; copolymer; terpolymer; and any combination thereof capable of interacting with the fibrous protein agent to assume the properties of a mucilage. Specific polymeric agents may include, but are not limited to, any of the polymeric agents that may be used with an extracted natural mucilage to form the mucilage copolymers described herein, including, but not limited to, an acrylamide; an acrylic acid; a polyacrylamide; a hydroxypropylcellulose; a hydroxypropylmethylcellulose; a hydroxyethyl cellulose; a carboxyethylcellulose; a carboxymethylhydroxyethylcellulose; a scleroglucal; a succinoglycan; a diutan; a polyvinylpyrrolidone; a xanthan gum; a carboxymethylcellulose; a guar gum; a hydroxyethyl guar; a hydroxypropyl guar; a carboxymethyl guar; a carboxymethylhydroxyethyl guar; a carboxymethylhydroxypropyl guar; a polyethylene oxide; a polyvinylalcohol; a polyvinylpyrrolidone-vinyl acetate copolymer; a polyvinylmethyether-maleic acid copolymer; a protein-amino acid copolymer; an acrylate; a quarternized aminoalkyl acrylate; dimethyl aminoethyl acrylate; a sulfonate; a glycolate; a lactate; 2-acrylamido-2-methylpropanesulfonic add; N,N-dimethyl acrylamide; vinylsulfonic acid; N-vinyl acetamide; N-vinyl formamide; any polymers thereof; any copolymers thereof; any terpolymers thereof; any derivatives thereof; and any combination thereof.

In some embodiments, the polymeric agent for use in the synthetic mucilage-type agent may be water-soluble. In other embodiments, the polymeric agent for use in the synthetic mucilage-type agent may be water-dispersible, such that it may be dispersed by heat, pH, or a solvent. For example, use of a polymeric agent that is a polyvinylpyrrolidone-polyacrylamide copolymer, a protein-amino acid copolymer (e.g., analine-glycine copolymer), or others that are particularly hydrophobic may be characterized as water-dispersible. In such cases, where a water-dispersible polymeric agent is selected and dispersion of the polymeric agent cannot be achieved by conditions in the subterranean formation (e.g., reaching a certain pH and/or temperature), the treatment fluid comprising the synthetic mucilage-type agent may further comprise a solvent. Any solvent that is compatible with the synthetic mucilage-type agent and that achieves the desired dispersion effect of the polymeric agent is suitable for use in the embodiments disclosed herein.

Suitable solvents may include, but are not limited to, butyl lactate; dipropylene glycol methyl ether; dipropylene glycol dimethyl ether; dimethyl formamide; diethyleneglycol methyl ether; ethyleneglycol butyl ether; diethyleneglycol butyl ether; propylene carbonate; methanol; isopropanol; butyl alcohol; d'limonene; a fatty acid methyl ester; butylglycidyl ether; glycol ether; any derivative thereof; and any combination thereof. Suitable glycol ether solvents may include, but are not limited to, diethylene glycol methyl ether; dipropylene glycol methyl ether; 2-butoxy ethanol; an ether of a C2 to C6 dihydric alkanol containing at least one C1 to C6 alkyl group; a mono ether of a dihydric alkanol; methoxypropanol; butoxyethanol; hexoxyethanol; any isomer thereof; and any combination thereof. Selection of an appropriate solvent is dependent on the polymeric agent chosen, as well as the fibrous protein, for use in the synthetic mucilage-type agent and is within the ability of one skilled in the art, with the benefit of this disclosure.

The fibrous protein agent in the synthetic mucilage-type agent provides the pituitance and the propensity of the agent to self-align in flow. Suitable fibrous protein agents may be any protein having a fibrous shape that is capable of interacting with the polymeric agent to assume the properties of a mucilage. Suitable fibrous protein agents include, but are not limited to, a nylon fiber; a latex fiber; a polyethylene fiber; a polytetrafluoroethylene fiber; a wood pulp fiber; a paper fiber; and any combination thereof. In some embodiments, the fibrous protein agent is present in the range of from about 0.000001% to about 10% by weight of the polymeric agent. In other embodiments, the fibrous protein agent is present in the range of from about 4% to about 9% by weight of the polymeric agent.

The mucilage compositions (e.g., the natural mucilage, the mucilage copolymer, and the synthetic mucilage-type agent) may be present in the treatment fluids of the embodiments disclosed herein in an amount in the range of from about 0.000001% to about 10% by weight of the treatment fluid. In other embodiments, the extracted mucilage compositions may be present in the treatment fluids in an amount in the range of from about 0.1% to about 5% by weight of the treatment fluid.

In some embodiments, the treatment fluids described herein may further comprise a polymeric agent in addition to the mucilage compositions in the treatment fluid. Suitable polymeric agents include any monomer; polymer; copolymer; terpolymer; and any combination thereof capable of acting as a friction reducer and/or viscosifier in the treatment fluid. Specific polymeric agents include, but are not limited to, any of those listed above for use in the mucilage copolymers and the synthetic mucilage-type agents including, but not limited to, an acrylamide; an acrylic acid; a polyacrylamide; a hydroxypropylcellulose; a hydroxypropylmethylcellulose; a hydroxyethyl cellulose; a carboxyethylcellulose; a carboxymethylhydroxyethylcellulose; a scleroglucal; a succinoglycan; a diutan; a polyvinylpyrrolidone; a xanthan gum; a carboxymethylcellulose; a guar gum; a hydroxyethyl guar; a hydroxypropyl guar; a carboxymethyl guar; a carboxymethylhydroxyethyl guar; a carboxymethylhydroxypropyl guar; a polyethylene oxide; a polyvinylalcohol; a polyvinylpyrrolidone-vinyl acetate copolymer; a polyvinylmethyether-maleic acid copolymer; a protein-amino acid copolymer; an acrylate; a quarternized aminoalkyl acrylate; dimethyl aminoethyl acrylate; a sulfonate; a glycolate; a lactate; 2-acrylamido-2-methylpropanesulfonic acid; N,N-dimethyl acrylamide; vinylsulfonic acid; N-vinyl acetamide; N-vinyl formamide; any polymers thereof; any copolymers thereof; any terpolymers thereof; any derivatives thereof; and any combination thereof. The polymeric agent may be present as an additional component to any of the treatment fluid embodiments disclosed herein in an amount in the range of from about 0.000001% to about 30% by weight of the treatment fluid. In other embodiments, the polymeric agent may be present as an additional component to any of the treatment fluid embodiments disclosed herein in an amount in the range of from about 0.01% to about 15% by weight of the treatment fluid.

In some embodiments, the treatment fluids disclosed herein may further comprise a mucin. As used herein, the term "mucin" refers to high molecular weight, glycosylated proteins capable of gelation. Mucins are naturally occurring proteins typically produced in the epithelial tissues of metazoans. The inclusion of mucins in the treatment fluids of the embodiments described herein may work synergistically with the mucilage compositions to further enhance the lubricity and viscosity of the treatment fluids. Suitable mucins include, but are not limited to, those characterized as secreted gel-forming mucins including, but not limited to, MUC2; MUC5AC; MUC5B; MUC6; and any combination thereof. In some embodiments, the mucins may be present as an additional component to any of the treatment fluid embodiments disclosed herein in an amount in the range of from about 0.000001% to about 30% by weight of the treatment fluid. In other embodiments, the mucins may be present as an additional component to any of the treatment fluid embodiments disclosed herein in an amount in the range of from about 0.01% to about 15% by weight of the treatment fluid.

In some embodiments, the treatment fluids may further comprise an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a surfactant; a particulate; a proppant; a gravel particulate; a lost circulation material; a foaming agent; a gas; a pH control additive; a breaker; a biocide; a crosslinker; a stabilizer; a scale inhibitor; a friction reducer, a clay stabilizing agent; and any combination thereof. One of ordinary skill in the art, with the benefit of this disclosure, will recognize whether to include one or more additives in the treatment fluids to achieve a particular desired result depending on factors, such as, the type of mucilage selected, the type of subterranean treatment performed, and the like.

Suitable base fluids for use in the treatment fluids disclosed herein include, but are not limited to, an aqueous base fluids; an aqueous-miscible base fluid; and an oil base fluid. Suitable aqueous base fluids for use in the treatment fluids include, but are not limited to, fresh water; saltwater (e.g., water containing one or more salts dissolved therein); brine (e.g., saturated salt water); seawater; and any combination thereof. Generally, the water may be from any source, provided that it does not contain components that might adversely affect the stability and/or performance of the treatment fluids. In certain embodiments, the density of the aqueous base fluid can be adjusted, among other purposes, to increase the density of the treatment fluids. One of ordinary skill in the art, with the benefit of this disclosure, will recognize when such density and/or pH adjustments are appropriate. In some embodiments, the pH range may range from about 4 to about 11. Suitable aqueous-miscible fluids may include, but are not limited to, an alcohol (e.g., methanol, ethanol, n-propanol, isopropanol, n-butanol, sec-butanol, isobutanol, and t-butanol); a glycerin; a glycol (e.g., polyglycols, propylene glycol, and ethylene glycol); a polyglycol amines; a polyol; any derivative thereof; any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, and the like); any in combination with an aqueous base fluid as described above; and any combination thereof. Suitable oil base fluids may include an alkane; an olefin; an aromatic organic compound; a cyclic alkane; a paraffin; a diesel fluid; a mineral oil; a desulfurized hydrogenated kerosene; and any combination thereof.

Because the mucilage compositions described herein exhibit their unique slippery colloidal dispersion properties in aqueous treatment fluids, when oil base fluids are used in the treatment fluids disclosed herein, an aqueous base fluid or an aqueous-miscible base fluid may be introduced into the subterranean formation after introducing the treatment fluid so as to cause the mucilage to adopt these properties (e.g., to "activate" the mucilage). In exemplary embodiments, the base fluid of the treatment fluid is an aqueous base fluid such that a post-flush with an aqueous base fluid or an aqueous-miscible fluid is not necessary.

In various embodiments, systems configured for delivering the treatment fluids disclosed herein to a downhole location are described. In various embodiments, the systems can comprise a pump fluidly coupled to a tubular, the tubular containing a treatment fluid comprising a mucilage composition (e.g., an extracted natural mucilage, a mucilage copolymer, or a synthetic mucilage-type agent)

The pump may be a high pressure pump in some embodiments. As used herein, the term "high pressure pump" refers to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments described herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method of treating a subterranean formation comprising: providing a treatment fluid comprising a base fluid and an extracted natural mucilage; and introducing the treatment fluid into the subterranean formation.

B. A method of treating a subterranean formation comprising: providing a treatment fluid comprising a base fluid and a mucilage copolymer, wherein the mucilage copolymer comprises an extracted natural mucilage and a polymeric agent; and introducing the treatment fluid into the subterranean formation.

C. A method of treating a subterranean formation comprising: providing a treatment fluid comprising a base fluid and a synthetic mucilage-type agent, wherein the synthetic mucilage-type agent comprises a polymeric agent and a fibrous protein agent; and introducing the treatment fluid into the subterranean formation.

Each of embodiments A, B, and C may have one or more of the following additional elements in any combination:

Element 1: Wherein the base fluid is an oil base fluid and wherein after introducing the treatment fluid into the subterranean formation, an aqueous base fluid or an aqueous-miscible base fluid is introduced into the subterranean formation so as to activate the extracted natural mucilage.

Element 2: Wherein the extracted natural mucilage is extracted from a mucilage-containing organism selected from the group consisting of taxonomic family Cactaceae; taxonomic family Alariaceae; taxonomic family Chordaceae; taxonomic family Laminariaceae; taxonomic family Lessoniaceae; taxonomic family Phyllariaceae; taxonomic family Pseudochordaceae; taxonomic family Malvaceae; taxonomic genus *Aloe*; taxonomic genus *Basella*; taxonomic genus *Chondrus*; taxonomic genus *Dioscorea*; taxonomic genus *Drosera*; taxonomic genus *Drosophyllum*; taxonomic genus *Trigonella*; taxonomic genus *Linum*; taxonomic genus *Splachnidium*; taxonomic genus *Glycyrrhiza*; taxonomic genus *Althaea*; taxonomic genus *Verbascum*; taxonomic genus *Abelmoschus*; taxonomic genus *Parthenium*; taxonomic genus *Pinguicula*; taxonomic genus *Plantago*; taxonomic genus *Salvia*; and any combination thereof.

Element 3: Wherein the extracted natural mucilage is present in the treatment fluid in an amount in the range of about 0.000001% to about 10% by weight of the treatment fluid.

Element 4: Wherein the treatment fluid comprises a polymeric agent selected from the group consisting of an acrylamide; an acrylic acid; a polyacrylamide; a hydroxypropylcellulose; a hydroxypropylmethylcellulose; a hydroxyethyl cellulose; a carboxyethylcellulose; a carboxymethylhydroxyethylcellulose; a scleroglucal; a succinoglycan; a diutan; a polyvinylpyrrolidone; a xanthan gum; a carboxymethylcellulose; a guar gum; a hydroxyethyl guar; a hydroxypropyl guar; a carboxymethyl guar; a carboxymethylhydroxyethyl guar; a carboxymethylhydroxypropyl guar; a polyethylene oxide; a polyvinylalcohol; a polyvinylpyrrolidone-vinyl acetate copolymer; a polyvinylmethyether-maleic acid copolymer; a protein-amino acid copolymer; an acrylate; a quarternized aminoalkyl acrylate; dimethyl aminoethyl acrylate; a sulfonate; a glycolate; a lactate; 2-acrylamido-2-methylpropanesulfonic acid; N,N-dimethyl acrylamide; vinylsulfonic acid; N-vinyl acetamide; N-vinyl formamide; any polymers thereof; any copolymers thereof; any terpolymers thereof; any derivatives thereof; and any combination thereof.

Element 5: Wherein the polymeric agent is present in the treatment fluid in an amount in the range of from about 0.000001% to about 30% by weight of the treatment fluid.

Element 6: Wherein the treatment fluid comprises a mucin in an amount in the range of from about 0.000001% to about 10% by weight in the treatment fluid.

Element 7: Wherein the base fluid is an oil base fluid and wherein after introducing the treatment fluid into the subterranean formation, an aqueous base fluid or an aqueous-miscible base fluid is introduced into the subterranean formation so as to activate the mucilage copolymer.

Element 8: Wherein the mucilage copolymer is a graft copolymer.

Element 9: Wherein the extracted natural mucilage is extracted from a mucilage-containing organism from taxonomic genus *Plantago* and the polymeric agent is acrylamide.

Element 10: Wherein the base fluid is an oil base fluid and wherein after introducing the treatment fluid into the subterranean formation, an aqueous base fluid or an aqueous-miscible base fluid is introduced into the subterranean formation so as to activate the synthetic mucilage-type agent, Element 11: Wherein the fibrous protein agent is selected from the group consisting of a nylon fiber; a latex fiber; a polyethylene fiber; a polytetrafluoroethylene fiber; a wood pulp fiber; a paper fiber; and any combination thereof.

Element 12: Wherein the synthetic mucilage-type agent is present in the range of from about 0.00001% to about 10% by weight of the treatment fluid, and wherein the fibrous protein agent is present in an amount in the range of from about 0.000001% to about 10% by weight of the polymeric agent.

By way of non-limiting example, exemplary combinations applicable to A, B, C include: A in combination with 1, 3, and 5; B in combination with 2, 7, and 7; C in combination with 6, 10, and 12.

Therefore, the embodiments described herein are well adapted to attain the ends and advantages mentioned as well as those that are inherent therein. The particular embodiments disclosed above are illustrative only and may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. if there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
   providing a treatment fluid comprising a base fluid, a mucilage copolymer, and a secreted gel-forming mucin selected from the group consisting of MUC2, MUC5AC, MUC5B, MUC6, and any combination thereof,
      wherein the mucilage copolymer comprises an extracted natural mucilage and a polymeric agent,
      wherein the mucin is present in an amount of from about 0.000001% to about 30% by weight in the treatment fluid, and
      wherein the mucilage copolymer and the mucin synergistically enhance the lubricity and viscosity of the treatment fluid; and
   introducing the treatment fluid into the subterranean formation.

2. The method of claim 1, wherein the base fluid is an oil base fluid and wherein after introducing the treatment fluid into the subterranean formation, an aqueous base fluid or an aqueous-miscible base fluid is introduced into the subterranean formation so as to activate the mucilage copolymer.

3. The method of claim 1, wherein the polymeric agent is selected from the group consisting of an acrylamide; an acrylic acid; a polyacrylamide; a hydroxypropylcellulose; a hydroxypropylmethylcellulose; a hydroxyethyl cellulose; a carboxyethylcellulose; a carboxymethylhydroxyethylcellulose; a scleroglucal; a succinoglycan; a diutan; a polyvinylpyrrolidone; a xanthan gum; a carboxymethylcellulose; a guar gum; a hydroxyethyl guar; a hydroxypropyl guar; a carboxymethyl guar; a carboxymethylhydroxyethyl guar; a carboxymethylhydroxypropyl guar; a polyethylene oxide; a polyvinylalcohol; a polyvinylpyrrolidone-vinyl acetate copolymer; a polyvinylmethyether-maleic acid copolymer; a protein-amino acid copolymer; an acrylate; a quarternized aminoalkyl acrylate; dimethyl aminoethyl acrylate; a sulfonate; a glycolate; a lactate; 2-acrylamido-2-methylpropanesulfonic acid; N,N-dimethyl acrylamide; vinylsulfonic acid; N-vinyl acetamide; N-vinyl formamide; any polymers thereof; any copolymers thereof; any terpolymers thereof; any derivatives thereof; and any combination thereof.

4. The method of claim 1, wherein the extracted natural mucilage is extracted from a mucilage-containing organism selected from the group consisting of taxonomic family Cactaceae; taxonomic family Alariaceae; taxonomic family Chordaceae; taxonomic family Laminariaceae; taxonomic family Lessoniaceae; taxonomic family Phyllariaceae; taxonomic family Pseudochordaceae; taxonomic family Malvaceae; taxonomic genus *Aloe*; taxonomic genus *Basella*; taxonomic genus *Chondrus*; taxonomic genus *Dioscorea*; taxonomic genus *Drosera*; taxonomic genus *Drosophyllum*; taxonomic genus *Trigonella*; taxonomic genus *Linum*; taxonomic genus *Splachnidium*; taxonomic genus *Glycyrrhiza*; taxonomic genus *Althaea*; taxonomic genus *Verbascum*; taxonomic genus *Abelmoschus*; taxonomic genus *Parthenium*; taxonomic genus *Pinguicula*; taxonomic genus *Plantago*; taxonomic genus *Salvia*; and any combination thereof.

5. The method of claim 1, wherein the extracted natural mucilage is extracted from a mucilage-containing organism from taxonomic genus *Plantago* and the polymeric agent is acrylamide.

6. The method of claim 1, wherein the mucilage copolymer is present in the treatment fluid in an amount in the range of from about 0.000001% to about 10% by weight of the treatment fluid.

7. The method of claim 1, wherein the mucilage copolymer is present in the treatment fluid in an amount in the range of from about 0.1% to about 5% by weight of the treatment fluid.

8. The method of claim 1, wherein the treatment fluid further comprises a solvent.

9. The method of claim 1, wherein the polymeric agent is a water-dispersible polymeric agent.

10. A method of treating a subterranean formation comprising:
    providing a treatment fluid comprising a base fluid, a mucilage copolymer, and a secreted gel-forming mucin selected from the group consisting of MUC2, MUC5AC, MUC5B, MUC6, and any combination thereof,
        wherein the mucilage copolymer comprises an extracted natural mucilage and a polymeric agent,
        wherein the mucilage copolymer is a graft copolymer,
        wherein the mucin is present in an amount of from about 0.000001% to about 30% by weight in the treatment fluid, and
        wherein the mucilage copolymer and the mucin synergistically enhance the lubricity and viscosity of the treatment fluid; and
    introducing the treatment fluid into the subterranean formation.

11. The method of claim 10, wherein the base fluid is an oil base fluid and wherein after introducing the treatment fluid into the subterranean formation, an aqueous base fluid or an aqueous-miscible base fluid is introduced into the subterranean formation so as to activate the mucilage copolymer.

12. The method of claim 10, wherein the polymeric agent is selected from the group consisting of an acrylamide; an acrylic acid; a polyacrylamide; a hydroxypropylcellulose; a hydroxypropylmethylcellulose; a hydroxyethyl cellulose; a carboxyethylcellulose; a carboxymethylhydroxyethylcellulose; a scleroglucal; a succinoglycan; a diutan; a polyvinylpyrrolidone; a xanthan gum; a carboxymethylcellulose; a guar gum; a hydroxyethyl guar; a hydroxypropyl guar; a carboxymethyl guar; a carboxymethylhydroxyethyl guar; a carboxymethylhydroxypropyl guar; a polyethylene oxide; a polyvinylalcohol; a polyvinylpyrrolidone-vinyl acetate copolymer; a polyvinylmethyether-maleic acid copolymer; a protein-amino acid copolymer; an acrylate; a quarternized aminoalkyl acrylate; dimethyl aminoethyl acrylate; a sulfonate; a glycolate; a lactate; 2-acrylamido-2-methylpropanesulfonic acid; N,N-dimethyl acrylamide; vinylsulfonic acid; N-vinyl acetamide; N-vinyl formamide; any polymers thereof; any copolymers thereof; any terpolymers thereof; any derivatives thereof; and any combination thereof.

13. The method of claim 10, wherein the extracted natural mucilage is extracted from a mucilage-containing organism selected from the group consisting of taxonomic family Cactaceae; taxonomic family Alariaceae; taxonomic family Chordaceae; taxonomic family Laminariaceae; taxonomic family Lessoniaceae; taxonomic family Phyllariaceae; taxonomic family Pseudochordaceae; taxonomic family Malvaceae; taxonomic genus *Aloe*; taxonomic genus *Basella*; taxonomic genus *Chondrus*; taxonomic genus *Dioscorea*; taxonomic genus *Drosera*; taxonomic genus *Drosophyllum*; taxonomic genus *Trigonella*; taxonomic genus *Linum*; taxonomic genus *Splachnidium*; taxonomic genus *Glycyrrhiza*; taxonomic genus *Althaea*; taxonomic genus *Verbascum*; taxonomic genus *Abelmoschus*; taxonomic genus *Parthenium*; taxonomic genus *Pinguicula*; taxonomic genus *Plantago*; taxonomic genus *Salvia*; and any combination thereof.

14. The method of claim 10, wherein the extracted natural mucilage is extracted from a mucilage-containing organism from taxonomic genus Plantago and the polymeric agent is acrylamide.

15. The method of claim 10, wherein the mucin is present in the treatment fluid in an amount in the range of from about 0.0001% to about 10% by weight in the treatment fluid.

16. The method of claim 10, wherein the mucilage copolymer is present in the treatment fluid in an amount in the range of from about 0.1% to about 5% by weight of the treatment fluid.

17. The method of claim 10, wherein the treatment fluid further comprises a solvent.

18. The method of claim 10, wherein the polymeric agent is a water-dispersible polymeric agent.

19. The method of claim 1, wherein the extracted natural mucilage is extracted from a mucilage-containing organism selected from the group consisting of taxonomic family Chordaceae; taxonomic family Phyllariaceae; taxonomic family Pseudochordaceae; taxonomic genus *Drosophyllum*; taxonomic genus *Splachnidium*; and any combination thereof.

20. The method of claim 10, wherein the extracted natural mucilage is extracted from a mucilage-containing organism selected from the group consisting of taxonomic family Chordaceae; taxonomic family Phyllariaceae; taxonomic family Pseudochordaceae; taxonomic genus *Drosophyllum*; taxonomic genus *Splachnidium*; and any combination thereof.

* * * * *